though solutions of the individual components of the

3,008,875
NEOMYCIN AND MIRYSTYL-GAMMA-PICOLINIUM HALIDE COMPOSITIONS

Jack K. Dale, Kalamazoo, Mich., assignor to The Upjohn Company, Kalamazoo, Mich., a corporation of Delaware
No Drawing. Filed Jan. 8, 1960, Ser. No. 1,178
8 Claims. (Cl. 167—65)

This invention relates to a composition having antiseptic properties and more particularly to a composition comprising neomycin and a myristyl-gamma-picolinium halide.

This application is a continuation-in-part of application Serial No. 458,679, filed September 27, 1954, which is in turn a continuation-in-part of application Serial No. 427,678, filed May 4, 1954, now U.S. Patent No. 2,861,920.

Prior to the present invention, it was known that neomycin and a myristyl-gamma-picolinium halide individually possessed antiseptic properties. However, until the present invention, it was not known that a composition comprising these compounds possessed highly advantageous unexpected properties. In addition to providing unexpected properties such as a broader antiseptic spectrum, self-sterilizing action in a limited time against commonly occurring microorganisms and more than additive antiseptic effects, the composition advantageously possesses superior color, chemical and physical stability. The said properties and stability provide a superior composition for use per se and in the manufacturing, storage and use of pharmaceutical products.

As used herein, the word neomycin refers to the antibiotic more fully described in Waksman, Neomycin, The Williams and Wilkins Company, Baltimore, Maryland, 1958. The word is intended to include the various forms, for example, the B and C forms and their active salts, for example, the water soluble sulfate and hydrochloride. The myristyl-gamma-picolinium halides of the present invention are those wherein the halogen has an atomic weight greater than 19, that is, the chloride, bromide and iodide of which the chloride is preferred.

The inventive composition can be prepared in a variety of forms. A dry admixture for subsequent dissolution in a solvent therefor, tablets and capsules exemplify the solid compositions that are prepared. The composition can also be prepared as a concentrated aqueous solution for subsequent dilution prior to use or as a more dilute solution ready for immediate use. Additionally, the composition can be prepared as an aqueous solution to be used as a vehicle into which therapeutically active ingredients can be incorporated. The unexpected properties of the composition are especially advantageous in the preparation, storage and use of pharmaceutical products for injection and for application to the eyes and ears.

The operative concentrations of the neomycin and the halide can be varied over a wide range. For example, in an aqueous solution, as little as 0.1% and as much as 40% of neomycin can be used while the concentration of the halide can vary from about 0.01 to about 0.2%. A concentration of about 6% of the neomycin and about 0.2% of the halide is preferred for an aqueous concentrate to be diluted ten-fold for use as a cold sterilizing solution. Preparation of a concentrate in this manner obviates the practical problem of handling bulk amounts. However, a more dilute solution containing 0.6% of the neomycin and 0.02% of the halide can be prepared for direct use as a cold sterilizing solution. In the case of the preparation of a vehicle into which therapeutic compounds can be incorporated, it is preferred to use a concentration of about 0.6% of the neomycin and about 0.02% of the halide. The dry admixture preferably contains by weight about 30 parts of the neomycin to about 1 part of the halide; however, about 10 to about 60 parts of neomycin to ½ to 1 part of the halide can be used. At the time of dissolution for use in the cold sterilization of instruments such as those used in surgery, the blend is dissolved in water. It is preferred to use sufficient water to provide a concentration by weight of about 0.6% of the neomycin and about 0.02% of the halide. Higher concentrations can be used although normally unnecessary and more costly. Lesser concentrations can be used where possible contamination of the instruments is known to be minimal.

Supplementary ingredients can be added to the compositions. Particularly advantageous supplementary ingredients are buffers, for example, sodium citrate; and polyalkylene glycols, for example, a polyethylene glycol of a molecular weight from 1500 to 6000 and ethylene oxide-polypropylene glycol condensation products such as Pluronic F-68 (Wyandotte Chemical Corporation). The polyalkylene glycols enhance pharmaceutical elegance, provide isotonicity and further stability by obviating caking or clumping and permitting easy resuspension even after extended periods of time.

The composition possesses a broader antiseptic spectrum than either of the individual components, especially against *Pseudomonas aeruginosa*. The self-sterilizing action and the more than additive antiseptic effects are particularly striking against the organisms *Aspergillus niger, Pseudomonas aeruginosa, Proteus vulgaris, Micrococcus aureus,* and *Bacillus cereus,* which organisms are commonly among the most troublesome, especially by contaminating eye and ear therapeutic preparations.

It has been found that the composition is free from stability problems which exist in solutions of the separate ingredients and cause discoloration, precipitation and, in the case of neomycin, loss of potency. Moreover, although solutions of the individual components of the composition are prone to discolor in the presence of closures used in multiple dose containers, the composition comprising the two components provides superior stability when in contact with said closures. The composition possesses advantageous unexpected properties in practical manufacturing. Although it has been formulated without the use of aseptic techniques, the composition has been tested after formulation and found to be sterile. Herein resides a great practical advantage in that the composition can be prepared without the excessive costs and tedious procedures involved in the use of aseptic techniques.

The compositions of this invention possess utility in antiseptic action and the treatment of various afflictions occurring in humans and animals.

The following examples are illustrative of the processes and products of this invention and are not to be construed as limiting.

EXAMPLE 1
Dry admixture 3.1 gms. of a dry admixture for subsequent dissolution in water is prepared as follows:

| | Gms. |
|---|---|
| Neomycin sulfate, U.S.P. | 3 |
| Myristyl-gamma-picolinium chloride | 0.1 |

The above ingredients are comminuted to a fine particle size, mixed and blended. At the time of use in the cold sterilization of instruments the blend is dissolved in 500 milliliters of water.

The amount of neomycin sulfate in the above formula is reduced to 1 gm. and increased to 6 gms. to provide equally satisfactory blends. Likewise, the amount of the halide can be reduced to 0.05 gm.

EXAMPLE 2

Aqueous concentrate 1000 milliliters of an aqueous concentrate is prepared as follows:

| | Gms. |
|---|---|
| Neomycin sulfate, U.S.P. | 60 |
| Myristyl-gamma-picolinium bromide | 2 |
| Purified water, U.S.P., q.s. ad. 1000 mls. | |

The concentrate is diluted tenfold to give a solution with superior action in the cold sterilization of instruments, operating tables and the like.

10 gms. of sodium metabisulfite and 270 gms. of sodium citrate can be added to the formula to provide a concentrate with enhanced stability.

The amount of neomycin sulfate in the above formula can be increased to 300 gms to provide a concentrate with increased antibiotic activity.

EXAMPLE 3

Dilute aqueous solution 5000 milliliters of a dilute aqueous solution is prepared as follows:

| | Gms. |
|---|---|
| Neomycin sulfate, U.S.P. | 30 |
| Myristyl-gamma-picolinium iodide | 1 |
| Purified water, U.S.P., q.s. ad. 5000 mls. | |

The soltuion is used for the cold sterilization of instruments with superior results.

5 gms. of sodium metabisulfite and 135 gms. of sodium citrate can be added to the formula to provide a solution with enhanced stability.

EXAMPLE 4

Aqueous concentrate 10,000 milliliters of an aqueous concentrate is prepared as follows:

| | Gms. |
|---|---|
| Neomycin sulfate (commercial grade) [1] | 1800 |
| Myristyl-gamma-picolinium chloride | 2.3 |
| Purified water, U.S.P., q.s. ad. 10,000 mls. | |

[1] 50% neomycin base.

The aqueous concentrate is filtered through a filter press with a filter aid. For use as a diaper wash with superior properties, the concentrate is diluted with water in the proportion of 1 fluid oz. of concentrate to 70 gallons of water.

EXAMPLE 5

Aqueous solution 1000 milliliters of an aqueous solution is prepared as follows:

| Each ml.: | Total, gms. |
|---|---|
| 0.02% myristyl-gamma-picolinium chloride | 0.2 |
| 0.1% sodium metabisulfite | 1 |
| 0.5% sodium citrate | 5 |
| 20% Neomycin sulfate, commercial grade | 200 |
| Sodium hydroxide solution, q.s. | |
| Purified water, U.S.P., q.s. ad. 1000 mls. | |

The solid ingredients are dissolved in part of the water and the pH is adjusted to 6 to 6.5 with the sodium hydroxide solution. The adjusted solution is filtered and made up to volume.

The solution is used with good results in the oral treatment of diarrhea in animals.

EXAMPLE 6

Injectable solution 19,000 milliliters of an injectable solution is prepared as follows:

| Each ml.: | Total, gms. |
|---|---|
| 0.23 mg. myristyl-gamma-picolinium chloride | 4.4 |
| 1.0 mg. sodium metabisulfite | 19 |
| 5.0 mgs. sodium citrate gran., U.S.P. | 95 |
| 55.0 mgs. neomycin sulfate po., U.S.P. | 1045 |
| Water for injection, U.S.P., q.s. ad. 19,000 mls. | |

Dissolved the myristyl-gamma-picolinium chloride, sodium metabisulfite, sodium citrate and neomycin sulfate in water for injection q.s. ad. 19,000 cc. Sterilize by filtration through a sterile filter. Fill aseptically into 30 ml. size sterile bottles. Plug and seal.

The solution is used with good results in the injectable treatment of acute systemic mastitis and metritis in cattle at a dose of 0.02 ml. per pound of body weight.

The amount of neomycin sulfate in the formula can be increased to 4180 gms. to provide a more concentrated solution for the injection administration of higher dosages.

EXAMPLE 7

Lyophilized collyrium 200 bottles of a lyophilized collyrium are prepared as follows:

| Each bottle: | | Total |
|---|---|---|
| 33 mgs. neomycin sulfate | gms | 6.6 |
| 25 mgs. cortisone acetate | gms | 5.0 |
| 35 mgs. sodium chloride A.R. | gms | 7.0 |
| 12.5 mgs. sodium bicarbonate, U.S.P. | gms | 2.5 |
| 1.0 cc. carboxymethylcellulose-Quatresin [1] gel [2] | cc | 200 |
| Double distilled water, q.s. ad | cc | 400 |

[1] Myristyl-gamma-picolinium chloride.
[2] Contains 20 mgs. of low viscosity carboxymethylcellulose and 0.58 mg. of Quatresin per cc.

The Quatresin and carboxymethylcellulose are dissolved in double distilled water to prepare a gel.

The neomycin sulfate, cortisone acetate, sodium chloride and sodium bicarbonate are mixed and the mixture is micronized. The gel is added and mixed intimately. The volume is made to 400 cc. with the water.

2 cc. is filled into 6 cc. size vials which are freeze dried and capped.

The freeze dried vial is reconstituted with 4.8 cc. sterile water to give an ophthalmic suspension which contains 0.5% cortisone acetate, 0.6% neomycin sulfate and 0.01% myristyl-gamma-picolinium chloride. Good results are obtained in the treatment of inflammation of the eyes.

EXAMPLE 8

Aqueous vehicle 1000 milliliters of vehicle is prepared as follows:

| Each ml.: | Total, gms. |
|---|---|
| 12% polyethylene glycol 4000, U.S.P. | 120 |
| 0.023% Quatresin (myristyl-gamma-picolinium chloride) | 0.23 |
| 0.6% neomycin sulfate | 6 |
| Deionized water, q.s. ad. 1000 mls. | |

The polyethylene glycol, myristyl-gamma-picolinium chloride and neomycin sulfate are dissolved to give a clear water-white solution useful as a suspending vehicle.

EXAMPLE 9

Sterile vehicle 1000 milliliters of a sterile vehicle is prepared as follows:

Each ml.: Total, gms.
- 5.5 mgs. neomycin sulfate po., U.S.P., blended — 5.5
- 4.5 mgs. sodium citrate gran., U.S.P. — 4.5
- 120 mgs. polyethylene glycol 4000, U.S.P. — 120
- 0.233 mg. myristyl-gamma-picolinium chloride — 0.233
- 1 mg. polyvinylpyrrolidone — 1.0
- Water for injection, U.S.P., q.s. ad, 1000
- Sodium hydroxide A.R. (to adjust pH), q.s.

Dissolve the neomycin sulfate, sodium citrate, polyethylene glycol, myristyl-gamma-picolinium chloride and polyvinylpyrrolidone in water for injection, q.s. ad. 1000 mls. Adjust the pH to 7.0–7.4. Sterilize by filtering through a sterile filter.

EXAMPLE 10

Eye-ear drops 4000 milliliters of drops for use in the eye and ear is prepared as follows:

Gms.
- Sterile vehicle prepared as in Example 9 — 4093
- Hydrocortisone acetate, U.S.P., micronized — 20

The hydrocortisone acetate is sterilized and suspended in the vehicle with rapid agitation for about 1 hour. The suspension is passed through a sterile colloid mill, screened through a sterile fine-mesh screen and filled aseptically into 5 ml. bottles.

The suspension gives good results in the treatment of eye and ear inflammations in humans.

EXAMPLE 11

Eye and ear drops

The amount of hydrocortisone acetate in Example 10 is increased to 60 gms. to provide a higher potency eye and ear drop preparation containing 1.5% by weight of the steroid.

EXAMPLE 12

Eye and ear drops 4000 milliliters of drops is prepared as follows:

Gms.
- Sterile vehicle prepared as in Example 9 — 4093
- Prednisolone acetate, micronized — 10

The prednisolone acetate is sterilized and suspended in the vehicle with rapid agitation for about 1 hour. The suspension is passed through a sterile colloid mill, screened through a sterile fine-mesh screen and filled aseptically into 5 ml. bottles.

The suspension gives good results in the treatment of eye and ear inflammations in humans.

EXAMPLE 13

Sterile vehicle 10,000 milliliters of a sterile vehicle is prepared as follows:

Each ml.: Total, gms.
- 4.2 mgs. neomycin base po — 42
- 4.5 mgs. sodium citrate gran., U.S.P., 30 — 45
- 120 mgs. polyethylene glycol 4000, U.S.P — 1200
- 0.23 mg. myristyl-gamma-picolinium chloride — 2.3
- 1 mg polyvinylpyrrolidone — 10
- Water for injection, q.s. ad. 10,000 mls.
- Hydrochloric acid A.R. (to adjust pH), q.s.

Dissolve the neomycin base, sodium citrate, polyethylene glycol, myristyl-gamma-picolinium chloride, and polyvinylpyrrolidone in water for injection, q.s. ad. 10,000 mls. Adjust pH to 6.5–6.8. Sterilize by filtering through a sterile filter.

EXAMPLE 14

Sterile suspension 2000 milliliters of a sterile aqueous suspension is prepared as follows:

Gms.
- Sterile vehicle as prepared in Example 13 — 2047
- 9α-fluoro-prednisolone acetate, micronized — 2

The steroid ester is sterilized and suspended in the vehicle with rapid agitation for about 1 hour. The suspension is passed through a sterile colloid mill, screened through a sterile fine-mesh screen and filled aseptically in 10 ml. vials.

The suspension gives good results in the injection treatment of articular inflammation in horses and ketosis in cows.

EXAMPLE 15

Sterile vehicle 10,000 milliliters of a sterile vehicle is prepared as follows:

Each ml. Total, gms.
- 6 mgs. neomycin sulfate po., U.S.P., blended — 60
- 4.5 mgs. sodium citrate gran., U.S.P. — 45
- 120 mgs. polyethylene glycol 4000, U.S.P — 1200
- 0.23 mg. myristyl-gamma-picolinium chloride — 2.3
- 1 mg. polyvinylpyrrolidone — 10
- Water for injection, q.s. ad. 10,000 mls.
- Sodium hydroxide A.R. (to adjust pH), q.s.

Dissolve the neomycin sulfate, sodium citrate, polyethylene glycol, myristyl-gamma-picolinium chloride and polyvinylpyrrolidone in water for injection, q.s. ad. 10,000 mls. Adjust pH to 7.2–7.4. Sterilize by filtering through a sterile filter.

EXAMPLE 16

Sterile suspension 4400 mls. of a sterile suspension is prepared as follows:

Gms.
- Sterile vehicle as prepared in Example 15 — 4490
- Prednisolone sesquihydrate, micronized — 46

The prednisolone sesquihydrate is sterilized and suspended in the vehicle with agitation during about 1 hour. The suspension is passed through a sterile colloid mill and filled into 10 ml. vials.

The suspension is used with good results in the injectable treatment of milk fever and ketosis in cows and allergic conditions in small animals.

EXAMPLE 17

Sterile vehicle 10,000 milliliters of a sterile vehicle is prepared as follows:

Each ml.: Total, gms.
- 18.33 mgs. neomycin sulfate po., U.S.P., blended — 183.3
- 8.33 mgs. phenylephrine hydrochloride, U.S.P. — 83.3
- 3.33 mgs. sodium chloride fine crystals, A.R. — 33.3
- 15 mgs. sodium citrate gran., U.S.P. — 150
- 33.3 mgs. propylene glycol, U.S.P. — 333
- 1.67 mgs. sorbic acid — 16.7
- Water for injection, q.s. ad. 10,000 mls.

Dissolve the neomycin sulfate, phenylephrine hydrochloride, sodium chloride, sodium citrate, propylene glycol and sorbic acid in q.s. 10,000 mls. of water for injection. Sterilize by filtration.

EXAMPLE 18

*Nasal spray*

1500 milliliters of a nasal spray is prepared as follows:

| Each ml.: | Total, gms. |
|---|---|
| 10 mgs. spermaceti, U.S.P. | 15 |
| 15 mgs. Tegacid [1] | 22.5 |
| 5 mgs. polysorbate 80, U.S.P. | 7.5 |
| 5 mgs. hydrocortisone acetate sterile, micronized | 7.5 |
| Vehicle as prepared in Example 17 | 460 |
| 0.23 mg. myristyl-gamma-picolinium chloride | 0.35 |
| Water for injection, U.S.P., 920 mls. | |

[1] Glyceryl monostearate-diethylaminoethyl oleyl amide phosphate.

Heat the spermaceti, Tegacid, and polysorbate 80 in a container on the steam bath until melted. Pass the melted mixture through 60 mesh screen and heat in dry oven at about 150° C. for 1 hour.

Add the heated mixture to 920 mls. of water for injection at about 75° C., with agitation for about ½ hour. Allow to cool to about 40° C. and mix in the hydrocortisone acetate and the vehicle. Add the myristyl-gamma-picolinium chloride as a sterile solution in 50 mls. of water. Mix well. Pass through a sterile colloid mill. Fill aseptically into 15 ml. bottles.

The suspension is used with good results as a spray in the treatment of nasal inflammation in humans.

EXAMPLE 19

*Nasal spray*

An equally satisfactory nasal spray is prepared by substituting 1.5 gms. of sterile prednisolone acetate for the 7.5 gms. of the hydrocortisone acetate in Example 18.

EXAMPLE 20

*Sterile solution*

3000 milliliters of a sterile solution is prepared as follows:

| Each ml.: | Total, gms. |
|---|---|
| 1 mg. scopolamine methyl bromide | 3 |
| 1 mg. sodium metabisulfite | 3 |
| 120 mgs. polyethylene glycol 4000, U.S.P. | 360 |
| 5 mgs. sodium citrate gran., U.S.P. | 15 |
| 5 mgs. neomycin sulfate po., U.S.P. | 15 |
| 0.23 mg. myristyl-gamma-picolinium chloride | 0.7 |
| Water for injection, q.s. ad. 3000 mls. | |

Dissolve the ingredients in q.s. ad. 3000 mls. of water for injection. Pass through a sterile filter and fill aseptically in 50 ml. vials.

The solution gives good results in the injectable treatment of intestinal hypermobility and diarrhea at a dose of ½ cc. intramuscularly to calves.

EXAMPLE 21

*Milk-miscible preparation*

1000 milliliters of a milk-miscible solution is prepared from the following water-soluble ingredients:

| Each ml.: | Total, gms. |
|---|---|
| 27.5 mgs. neomycin sulfate | 27.5 |
| 6000 units polymyxin B sulfate (assay 7000 u./mg.) | 0.860 |
| 2.2 mgs. myristyl-gamma-picolinium chloride | 2.2 |
| 4.5 mgs. sodium citrate | 4.5 |
| 1 mg. sodium metabisulfite | 1.0 |
| 137.5 mgs. dihydrostreptomycin sulfate | 137.5 |
| 30 mgs. polyethylene glycol 4000 | 30.0 |
| Deionized water, q.s. ad. 1000 mls. | |

The solution is used with good results in the treatment of mastitis in milk cows.

EXAMPLE 22

*Milk-miscible preparation*

The complementary activity of an anti-inflammatory steroid is provided by adding to the formula of Example 21 prednisolone sesquihydrate in the amount of 1 gm.

EXAMPLE 23

*Milk-miscible preparation*

The prednisolone sesquihydrate of Example 22 can be substituted by hydrocortisone 2 gms., hydrocortisone acetate 2 gms., 9α-fluoro-prednisolone acetate 0.25 gm., 6α-methyl-prednisolone 0.8 gm., 6α-methyl-prednisolone acetate 0.8 gm., or 21-desoxy-9α-fluoro-6α-methyl-prednisolone 0.1 gm. to provide equally satisfactory preparations. A mixture of a steroid ester and a steroid alcohol can also be used.

EXAMPLE 24

*Sterile vehicle*

8000 ml. of a sterile vehicle is prepared as follows:

| Each ml.: | Total, gms. |
|---|---|
| 5.5 mgs. neomycin sulfate po., U.S.P. | 44 |
| 4.5 mgs. sodium citrate gran., U.S.P., 30–80 mesh | 36 |
| 1.0 mg. sodium metabisulfite | 8 |
| 6.0 mgs. tetracaine hydrochloride, U.S.P. | 48 |
| 120.0 mgs. polyethylene glycol 4000, U.S.P. | 960 |
| 0.23 mg. myristyl-gamma-picolinium chloride | 1.8 |
| 1.0 mg. polyvinylpyrrolidone | 8 |
| Water for injection, q.s. ad. 8000 mls. | |
| Sodium hydroxide A.R. (to adjust pH), q.s. | |

Dissolve the neomycin sulfate, sodium citrate, sodium metabisulfite, tetracaine hydrochloride, polyethylene glycol, myristyl-gamma-picolinium chloride, and polyvinylpyrrolidone in water for injection, q.s. ad. 8000 mls. Adjust to pH 5.5 to 6.0. Sterilize by filtering through a sterile filter.

EXAMPLE 25

*Eye and ear drops*

4000 mls. of drops is prepared as follows:

| | Gms. |
|---|---|
| Vehicle as prepared in Example 24 | 4100 |
| Prednisolone acetate, micronized | 11 |

The prednisolone acetate is sterilized and suspended in the vehicle with rapid agitation for about 1 hour. The suspension is passed through a sterile colloid mill and a fine mesh sterile screen and filled into 3 ml. bottles. The suspension gives excellent results in the treatment of eye and ear inflammations in animals.

EXAMPLE 26

*Aqueous suspension*

1000 mls. of a suspension for oral use is prepared as follows:

| Each ml.: | Total |
|---|---|
| 33 mgs. sulfamerazine | gms.   33 |
| 33 mgs. sulfadiazine | gms.   33 |
| 33 mgs. sulfamethazine | gms.   33 |
| 100 mgs. neomycin sulfate, U.S.P. | gms.   100 |
| 0.2 mg. myristyl-gamma-picolinium chloride | mgs.   200 |
| Purified water, U.S.P., q.s. ad. 1000 mls. | |

The neomycin sulfate and myristyl-gamma-picolinium are dissolved in a major portion of the water. The finely comminuted sulfa compounds are added and the whole is intimately mixed. The suspension is made up to volume, passed through a colloid mill and filled into 1 oz. bottles.

A dose of one teaspoonful gives excellent results in the treatment of diarrhea and systemic infections accompanied by diarrhea.

EXAMPLE 27

*Eye drops*

2000 mls. drops is prepared as follows:

Each ml.: Total, gms.
50 mgs. homatropine hydrobromide _____ 100
Vehicle as prepared in Example 13 _____ 2030

The homatropine hydrobromide is dissolved in the vehicle and the solution is sterile filtered. The filtered solution is filled into sterile containers and used with excellent results as an eye drop in humans.

EXAMPLE 28

A therapeutic composition in dry form suitable for subsequent dissolution in an aqueous vehicle is prepared as follows:

Mgs.
Dihydrostreptomycin sulfate _____ 250
Neomycin sulfate _____ 250
Myristyl-gamma-picolinium chloride _____ 1

The dry ingredients are uniformly mixed and blended. At the time of use the blend is dissolved in 5 mls. of water. Good results in the oral treatment of diarrhea in humans are obtained at a dose of 5 mls., 4 times daily.

EXAMPLE 29

*Sterile vehicle*

By substituting 140 gms. of polyethylene glycol 6000 for the 120 gms. of polyethylene glycol 4000 in Example 9, an equally satisfactory vehicle is obtained.

EXAMPLE 30

*Sterile vehicle*

By substituting 750 gms. of polyethylene glycol 1500 for the 1200 gms. of polyethylene glycol 4000 in Example 15, an equally satisfactory vehicle is obtained.

EXAMPLE 31

*Oral preparation*

1000 mls. of an oral fluid preparation is prepared as follows:

Each ml.: Total
200 mgs. Pluronic F-68 _____ gms__ 200
25 mgs. neomycin sulfate, U.S.P _____ gms__ 25
0.2 mg. myristyl-gamma-picolinium chloride
     mgs__ 200
Purified water, U.S.P., q.s. ad. 1000 mls.

The solid ingredients are dissolved in the major proportion of the water and made up to volume.

At a dose of 5 mls. (one teaspoonful) the preparation gives good results as a fecal softener in humans.

EXAMPLE 32

*Tablet pharmaceutical carrier*

1000 oral tablets are prepared as follows:

Each tablet: Total, gms.
250 mgs. neomycin sulfate _____ 250
1 mg. myristyl-gamma-picolinium chloride _____ 1

The ingredients are blended and formed into compressed tablets using conventional diluents and techniques. A dose of 1 tablet four times daily provides good results in humans in the oral treatment of diarrhea.

EXAMPLE 33

*Capsule pharmaceutical carrier*

1000 two-piece gelatin capsules are prepared as follows:

Each capsule: Total, gms.
1.5 gms. neomycin sulfate _____ 1500
0.1 gm. myristyl-gamma-picolinium chloride __ 100

The above ingredients are uniformly mixed and filled into two-piece capsules. The contents of one capsule are dissolved in 500 mls. of water to prepare a cold sterilizing solution for surgical instruments.

What is claimed is:

1. A composition having antiseptic properties comprising neomycin and a myristyl-gamma-picolinium halide wherein the halogen has an atomic weight greater than 19.

2. A dry admixture having antiseptic properties comprising neomycin and a myristyl-gamma-picolinium halide wherein the halogen has an atomic weight greater than 19.

3. An aqueous solution having antiseptic properties comprising neomycin and a myristyl-gamma-picolinium halide wherein the halogen has an atomic weight greater than 19.

4. A dry admixture having antiseptic properties comprising by weight from about 10 to about 60 parts of neomycin and from about ½ to about 1 part of a myristyl-gamma-picolinium halide wherein the halogen has an atomic weight greater than 19.

5. An aqueous solution having antiseptic properties comprising by weight from about 0.1 to about 40% of neomycin and from about 0.01 to about 0.2% of a myristyl-gamma-picolinium halide wherein the halogen has an atomic weight greater than 19.

6. A pharmaceutical preparation having antiseptic properties comprising neomycin, a myristyl-gamma-picolinium halide wherein the halogen has an atomic weight greater than 19, a therapeutic agent and a pharmaceutical carrier.

7. A pharmaceutical preparation having antiseptic properties comprising neomycin, a myristyl-gamma-picolinium halide wherein the halogen has an atomic weight greater than 19, a polyalkylene glycol, a therapeutic agent and a pharmaceutical carrier.

8. A solid composition having antiseptic properties comprising neomycin, a myristyl-gamma-picolinium halide wherein the halogen has an atomic weight greater than 19 and a solid pharmaceutical carrier.

References Cited in the file of this patent

UNITED STATES PATENTS 2,730,483    Mast et al. _____ Jan. 10, 1956
2,799,620    Waksman et al. _____ July 16, 1957

OTHER REFERENCES

Quatresin, Trademark 408,113, registered July 18, 1944.

First et al.: Arch. Pharm., vol 283, pages 238–243, 1950.

Schwyzer: Minnesota Med., vol. 29, pages 321–325, 1946.